July 22, 1924.  
C. WEINBERG  
AUTOMOBILE FENDER  
Filed Sept. 1, 1921

Inventor  
C. WEINBERG  
By his Attorney

July 22, 1924.

C. WEINBERG

AUTOMOBILE FENDER

Filed Sept. 1, 1921

Inventor
C. WEINBERG
By his Attorney

Patented July 22, 1924.

1,502,495

UNITED STATES PATENT OFFICE.

CHARLES WEINBERG, OF BROOKLYN, NEW YORK.

AUTOMOBILE FENDER.

Application filed September 1, 1921. Serial No. 497,568.

*To all whom it may concern:*

Be it known that I, CHARLES WEINBERG, a citizen of the United States, and resident of Brooklyn, in the county of Kings and State of New York, have invented certain new and useful Improvements in Automobile Fenders, of which the following is a specification.

This invention relates to a combined fender and receptacle adapted for attachment to automobiles.

The invention has for an object the provision of means for protecting the automobile from injury liable to be sustained by accidental collisions with adjacent vehicles or other objects.

A further object of the invention is to provide handy means for carrying extra tires and baggage; and a still further object is to provide means for protecting said tires and baggage.

In carrying out my invention I employ a metal frame having a box attached thereto for carrying extra tires, blankets, lunch boxes or other articles, means for rigidly holding the tires in place, and a resilient fender adapted for sustaining impact of vehicles or other objects and protecting the box, its contents and the automobile body, all as hereinafter fully described and specifically set forth in the appended claims.

In the accompanying drawings forming part of this specification, Figure 1 is a perspective view illustrating an embodiment of my improvements;

Figure 1:
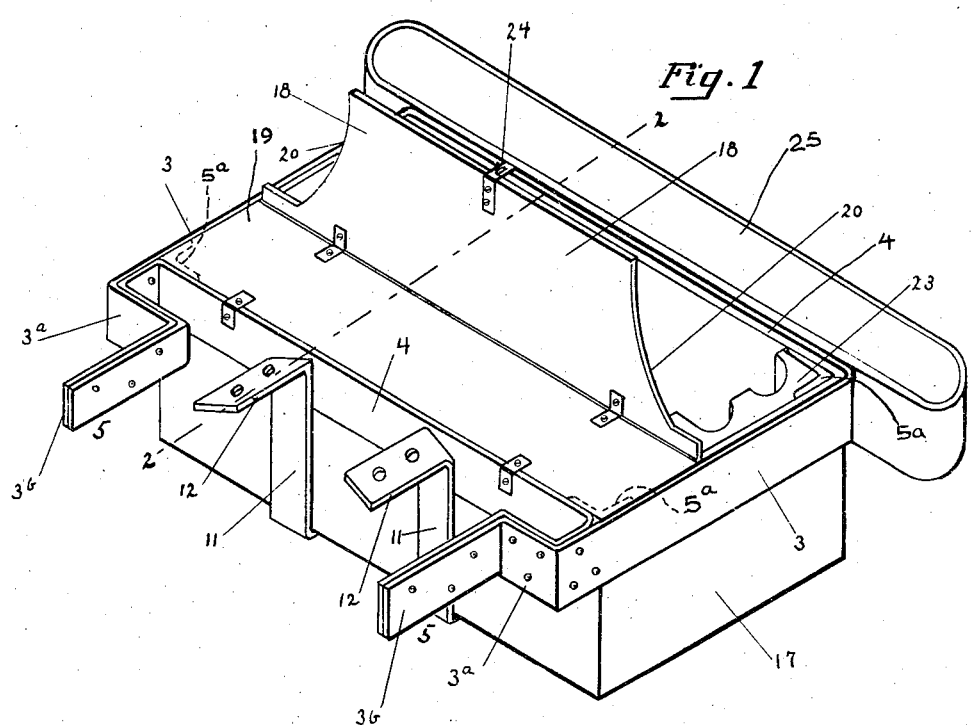
Figure 2:
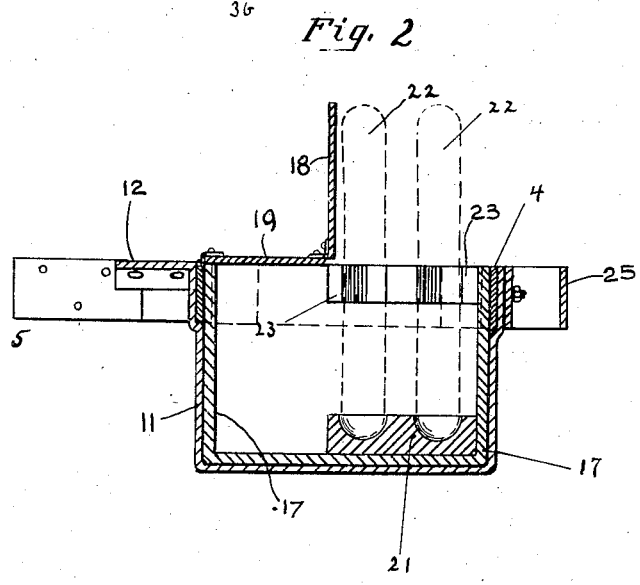
Fig. 2 is a cross sectional view taken on the line 2—2 of Fig. 1.
Figure 3:
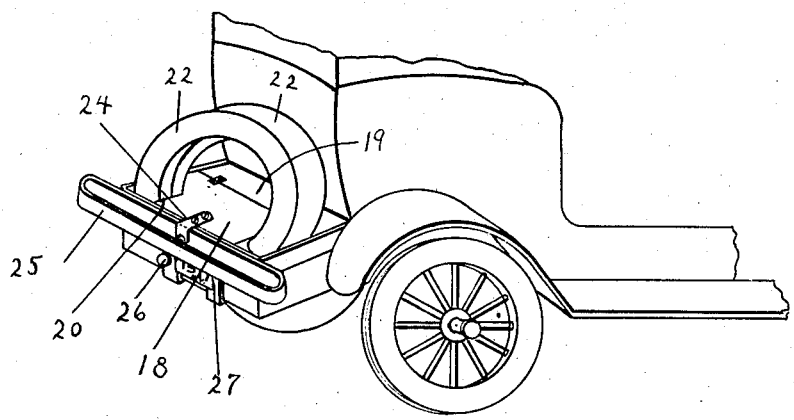
Fig. 3 is a perspective view showing the rear end of an automobile having my improved device attached thereto.
Figure 4:
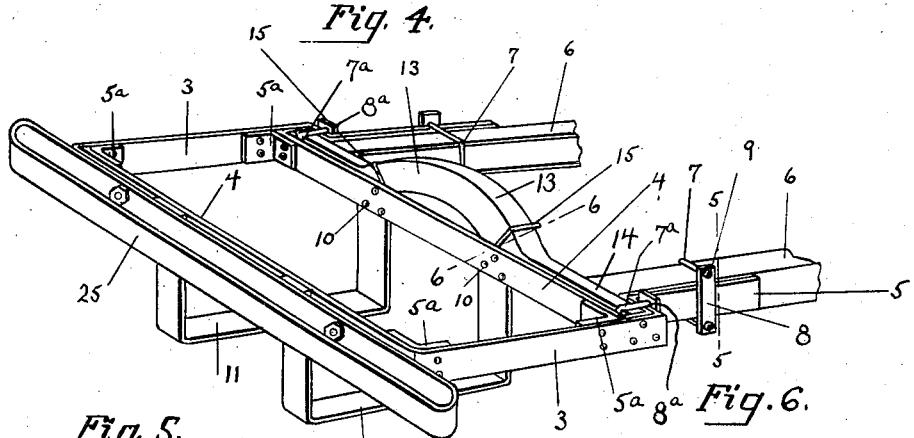
Fig. 4 is a perspective view of a fragmentary part of an automobile chassis showing the mode of attaching the device, the box or receptacle being removed.
Figure 5:
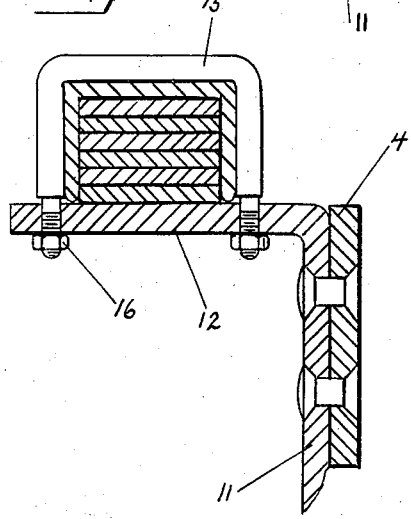
Fig. 5 is a detail cross sectional view taken on the line 5—5 of Fig. 4.
Figure 6:
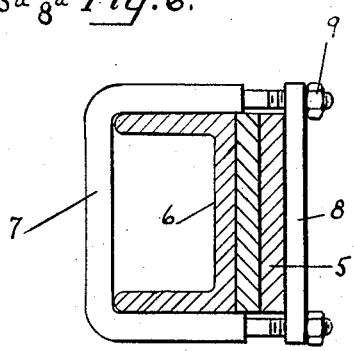
Fig. 6 is a similar cross sectional view taken on the line 6—6 of Fig. 4.

In the example of my invention illustrated by the drawings, 2 indicates a wrought metal frame embodying end bars 3 and cross bars 4, the structure being reinforced by means of angle-iron corner braces $5^a$.

Each end bar has an inwardly turned end part $3^a$ extended at right angles and terminating in an arm $3^b$, and one cross bar 4 has a correspondingly shaped extension which is securely riveted to the said extension of the bar 3, whereby a stout arm 5 is provided for attachment to the horizontal side bar 6 of an automobile chassis, by means of U bolts 7, clamping plates 8 and nuts 9, similar U bolts $7^a$ and plates $8^a$ being employed for engaging the cross bar 14 of the chassis.

Fixed to the bars 4 by means of rivets 10 are depending straps 11, each of said straps having a rearwardly extended arm 12 which is shaped to contact under the arched part 13 of the transverse member 14 of the chassis, and said arms are fixed to said transverse member by means of U bolts 15, thus securely attaching the frame 2 to the chassis.

Supported within the frame 2 is a box 17 having a hinged lid comprising two leaves 18 and 19, the leaf 18 having end recesses 20.

Within the box is a grooved block 21 adapted for engagement with tires 22, said tires held in upright position within said block by means of grooved guides 23 located one at each end of the box 17, whereby when the leaf 18 is closed its recesses 20 act, in conjunction with the guides 23, to securely hold the tires in place, any suitable locking means, as 24 being employed for fastening the lid in closed position.

Secured across the rearward cross-bar 4 is a resilient fender 25 adapted for protecting the device and a tail light 26 and license plate 27, which are secured to the rearward cross-bar 4.

In the operation and use of this invention it is manifest that when the lid is closed and fastened the tires are securely held in upright position within the recesses 20, while at the same time considerable space is provided within the box to hold excess baggage which is generally carried within the automobile. Further, the box being interposed between the fender and automobile, is protected from direct impact of adjacent vehicles and its contents including the extra tires, are thoroughly protected.

Having thus described my invention, what I claim as new and desire to secure by Letters Patent, is:

1. A receptacle for attachment to automobiles, said receptacle comprising a box for carrying tires and other articles, and closure means for coincidentally closing said box and clamping tires therein.

2. A combined receptacle and receptacle support for attachment to automobiles, comprising a rectilinear frame and means for detachably securing the same to one end of an automobile chassis, a box held by said frame, and means for coincidentally closing said box and clamping tires partly within and partly extending from said box, and a transversely extended resilient buffer fixed to the side of said frame farthest from the end of the automobile chassis upon which said frame is mounted for the protection of the aforesaid box and the automobile to which it is attached.

3. A combined receptacle and receptacle support for attachment to automobiles, comprising a rectilinear frame, and means for detachably securing the same to one end of an automobile chassis, a box held by said frame, and means for coincidentally closing said box and clamping tires partly within and partly extending from said box, and a transversely extended elongated endless loop of resilient metal having one of its lengths fixed to said frame and the other spaced therefrom for the protection of the aforesaid box and its contents.

4. In an attachment for automobiles, a frame and means for fastening the same, to the rearward end of an automobile chassis, a box carried by said frame, and means for clamping extra tires within said box, and a transversely extended resilient protective fender located rearwardly of said box.

5. In an attachment for automobiles, a frame and means for fastening the same to the rearward end of an automobile chassis, and a box carried by said frame, said box having means for supporting extra tires in upright position and space for carrying baggage, and means for maintaining said tires fixed within said box, and a resilient fender transversely extended rearwardly of said box.

Signed at Brooklyn, in the county of Kings and State of New York, this 21st day of July, A. D. 1921.

CHARLES WEINBERG.